(12) United States Patent
Chen

(10) Patent No.: US 7,877,846 B1
(45) Date of Patent: Feb. 1, 2011

(54) RATCHET BUCKLE WITH EXCESS STRAP RETENTION ARM AND DOUBLE LAYERED ARM

(76) Inventor: Weiguo Chen, Ningbo Xuli Metal Products Co., Ltd, Yongle Village, Wuxiang Zhen, Yinzhou District, Ningbo, Zhejiang (CN) 315112

( * ) Notice: Subject to any disclaimer, the term of this patent is extended or adjusted under 35 U.S.C. 154(b) by 127 days.

(21) Appl. No.: 12/467,088

(22) Filed: May 15, 2009

(51) Int. Cl.
*B25B 25/00* (2006.01)
*B60P 7/06* (2006.01)
(52) U.S. Cl. ............... 24/68 CD; 254/217; 410/100
(58) Field of Classification Search ............ 24/68 CD, 24/68 R, 68 B, 69 CT, 71 ST, 698.1, 909; 254/217, 218, 237, 238–239, 243, 202, 206, 254/209, 212, 213, 222, 223, 224, 226, 245, 254/254, 369; 410/96, 100, 103; 296/100.1, 296/100.4, 100.15, 100.16; 242/388.3, 388.4, 242/389, 396.4
See application file for complete search history.

(56) References Cited

U.S. PATENT DOCUMENTS

| | | |
|---|---|---|
| 3,718,315 A | 2/1973 | Huber |
| 4,185,360 A | 1/1980 | Prete, Jr. et al. |
| 4,227,286 A | 10/1980 | Holmberg |
| 4,324,022 A | 4/1982 | Prete, Jr. |
| 4,542,883 A | 9/1985 | Rutzki |
| 5,103,536 A | 4/1992 | Kamper |
| 5,271,606 A | 12/1993 | Kamper |
| 5,426,826 A | 6/1995 | Takimoto |
| 5,494,387 A | 2/1996 | Ruegg |
| 5,611,520 A | 3/1997 | Soderstrom |
| 5,904,341 A | 5/1999 | Norrby |
| 6,195,848 B1 | 3/2001 | Jackson et al. |
| 6,547,218 B2 | 4/2003 | Landy |
| 6,609,275 B1 * | 8/2003 | Lin .................... 24/68 CD |
| 7,281,701 B1 | 10/2007 | Huang |
| 7,296,326 B2 | 11/2007 | Madachy et al. |
| 7,350,767 B2 | 4/2008 | Huang |
| 7,789,603 B2 * | 9/2010 | Huck ....................... 410/100 |
| 2004/0084558 A1 * | 5/2004 | Huang .................... 242/385.4 |
| 2008/0273937 A1 | 11/2008 | Hanson |
| 2009/0100653 A1 * | 4/2009 | Wang .................... 24/68 CD |

FOREIGN PATENT DOCUMENTS

EP 1876374 A1 1/2008

* cited by examiner

*Primary Examiner*—Robert J Sandy
(74) *Attorney, Agent, or Firm*—David L. Tingey

(57) ABSTRACT

The ratchet buckle for tightening a strap under a ratchet action provides a retention arm that constrains folded excess strap to the buckle to prevent it from flapping free during transport of cargo that the strap secures. A guard is provided outside a crank arm that is rotatably journaled to a base by a spindle on its forward end. The crank arm is secured to the guard intermediate the length of the guard with the guard extending rearward of the crank arm. The guard thus covers a ratchet wheel and the crank arm and with the crank arm forms an effective double-layered crank arm. The retention arm is rotatable on a handle shaft mounted to the guard rearward end, biased down onto folded excess strap.

21 Claims, 12 Drawing Sheets

RATCHET BUCKLE WITH EXCESS STRAP RETENTION ARM AND DOUBLE LAYERED ARM

BACKGROUND

1. Field of the Invention

This invention relates to tie-downs, as may be used to secure cargo to a vehicle.

2. Prior Art

It is known to have a ratchet buckle that secures cargo to a vehicle. It is also known to have a ratchet buckle in which a strap is pulled nearly taut through the buckle assembly and then tightened by a ratchet action in the buckle. This typically leaves excess strap unattached, which is a hazard during travel. This problem was addressed by U.S. Pat. No. 7,296,326 by Madachy et al in which is disclosed a ratchet buckle that includes a rotating shaft around which the loose end of the strap may be wound. The length of strap that can be wound around the shaft is limited by the clearance between the shaft and the cargo.

The object of the present invention is to provide an improved excess strap retention apparatus that cooperates with a ratchet buckle to secure excess strap to the buckle during travel. Another object is to provide a guard to shield a user from buckle components such as sprocket wheels that may injure the user while the user is manipulating the strap and ratchet buckle to tighten the strap about cargo and, similarly, to loosen the strap and ratchet buckle from about the cargo. Another object is to provided a double layered crank arm in cooperation with the guard.

SUMMARY OF THE INVENTION

The ratchet-based ratchet buckle of the present invention features a retention arm that rotates from a handle rearward of the ratchet buckle base over excess strap folded onto the ratchet buckle. The retention arm can be used generally with many tie down buckles and in particular with those buckles that employ a ratcheting action to tighten a strap that is positioned to tie down cargo. Typically, a first or forward strap is secured to a position remote from the buckle, often by a hook on its distal end. A second or rearward strap is also secured to a different position remote from the buckle, also usually through a hook on its distal end with its proximal end secured to a transverse shaft between base sides at the back of the buckle, typically without length adjustment. The proximal end of the forward strap is connected to a spindle that is reciprocally rotated by a user moving a handle relative to a base, which handle in turn rotates a ratchet wheel to which the spindle is attached. The ratchet wheel is prevented from counter rotating by a pawl, all in a normal ratchet action.

The forward strap may be connected to the spindle securely in which case the strap simply wraps around the spindle as the spindle rotates. The length of the strap is then limited to that length that can be wound on the spindle. The forward strap can also be connected to the spindle by inserting the strap through a slot that divides the spindle into equal halves, in which case in operation, after the strap distal end is remote hooked somewhere, the strap is manually pulled through the spindle until it is nearly taut so that only a short strap length need be wound around the spindle. This can leave an appreciable length of strap pulled through the spindle, referred to herein as the unused portion of the strap, or unused strap. A portion of the unused strap will also wind around the spindle as the spindle rotates to tighten the strap. The portion of the unused strap that remains not wound around the spindle is referred to as the excess portion of the strap, or excess strap. It is this excess strap that is folded and secured over the buckle by the retention arm.

Ratchet wheels are coaxial with the spindle on each spindle end. In reciprocally operating the handle to tighten or loosen the forward strap, the user is exposed to injury by the buckle components, particularly the ratchet wheels. It is therefore advantageous to provide a guard to shield the components, and in particular the ratchet mechanism from the user. A ratchet guard is therefore provided on each buckle side to cover the ratchet wheel and the crank arm that connects the handle to the spindle. The ratchet guard is outside the crank arm and serves its function as a shield and adds to the aesthetic qualities of the ratchet buckle but also in connecting to the crank arm forms an effective double layered crank for additional strength and for increased leverage it extends rearward beyond the crank arm.

The retention arm is typically broad or panel like to also serve as a top to the buckle that covers a substantial portion of the buckle from the handle on which it rotates to the pawl release near the ratchet wheel except a substantial arm recess in the retention arm opposite the handle through which the excess strap may be routed and through which a folded excess strap may lie on top of the buckle and even extend from over the buckle where it is secured by the retention arm to rearward of the buckle thus allowing the excess strap to be very long, limited only by the number of folds that can fit through the arm recess and a distance from the buckle a user is willing to allow the folded excess strap to extend. A representative form for the panel-like retention arm is shown but that form should not be interpreted as a limitation on the shape of the retention arm. Note that the excess strap can also extend forward of the buckle, which when combined with the rearward extent and layers of excess strap the buckle can accommodate a very long excess strap. More typically, the excess strap is folded to rest fully on the buckle. The retention arm is not necessarily broad or panel like for the retention arm to perform its primary function of securing a folded excess strap down on the top of the base, however it is aesthetically more pleasing and does provide a partial shield of the apparatus under it for added and general protection against damage and dirt. In fact, an alternate retention is described below in which the retention arm is in the form of a wire frame. It should be understood that the forms of the described panel-like and the wire frame retention arms are exemplary only and meant to be only representative of the large number of forms and configurations a retention arm could take, all of which are deemed included in the description given.

In normal use the excess strap is guided to its retention position on top of the buckle from over the top of the spindle and down through a release gap between pawls on each side of the buckle that engage the sprocket wheels. The excess strap is then guided over the lock plate to the back of the buckle and over the transverse shaft to which the rearward strap is secured. From the transverse shaft the excess strap is routed under the handle and between crank arms on each buckle side, through the retention arm recess and then folded and placed folded on top of the buckle. The retention arm is then rotated from the handle down onto the folded excess strap typically with a portion of the folded excess strap extending through the arm recess. The arm is held down under spring tension, or equivalently, may be constrained with a hard link to an underlying component. For a quick use, the excess strap can be guided from the top of the spindle directly over the top of the buckle where it is folded and held in place by the retention arm. Both manners of use are deemed included in the detailed description below.

BRIEF DESCRIPTION OF THE DRAWINGS

The ratchet buckle with an excess strap retention arm is illustrated in the following 15 figures.

DETAILED DESCRIPTION OF THE PREFERRED EMBODIMENT

Figure 1:
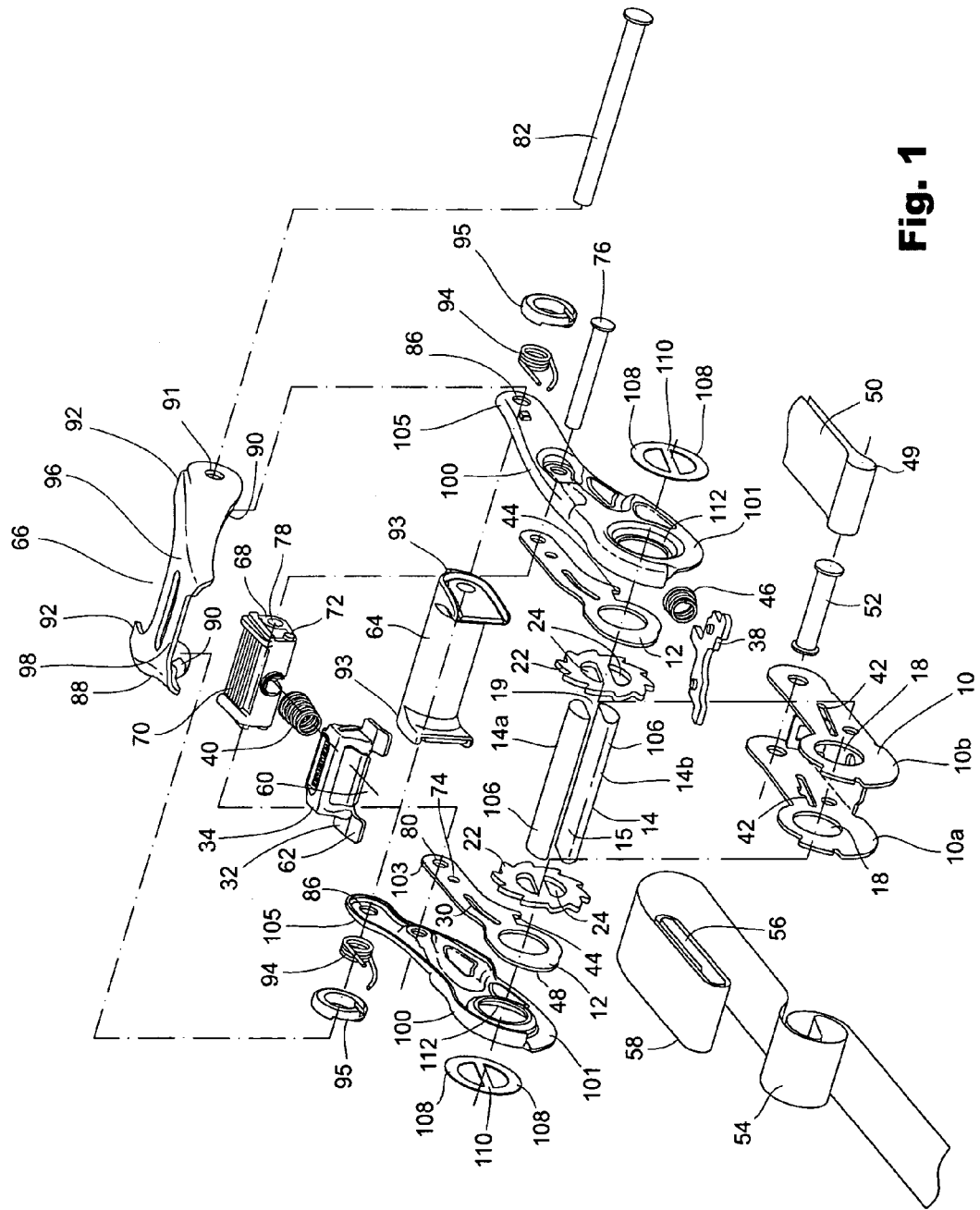
FIG. 1 is an exploded isometric view of the ratchet buckle of the present invention.
Figure 2:
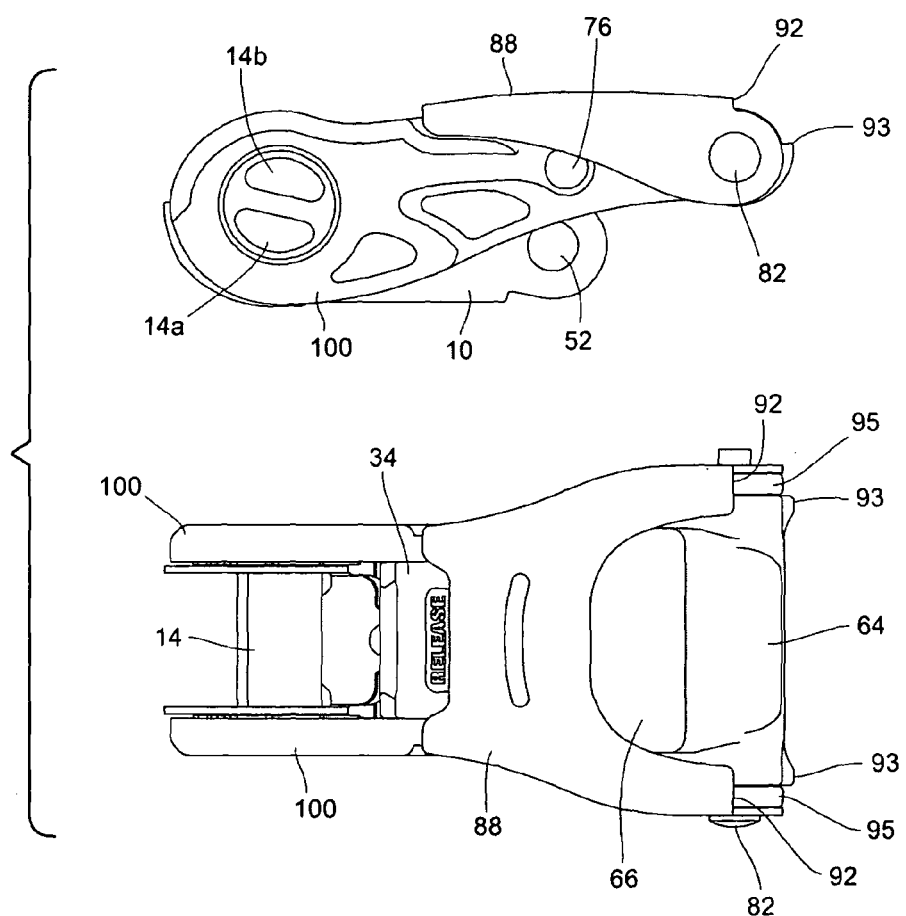
FIG. 2 is a combined side view and top view of the ratchet buckle of the present invention.
Figure 3:
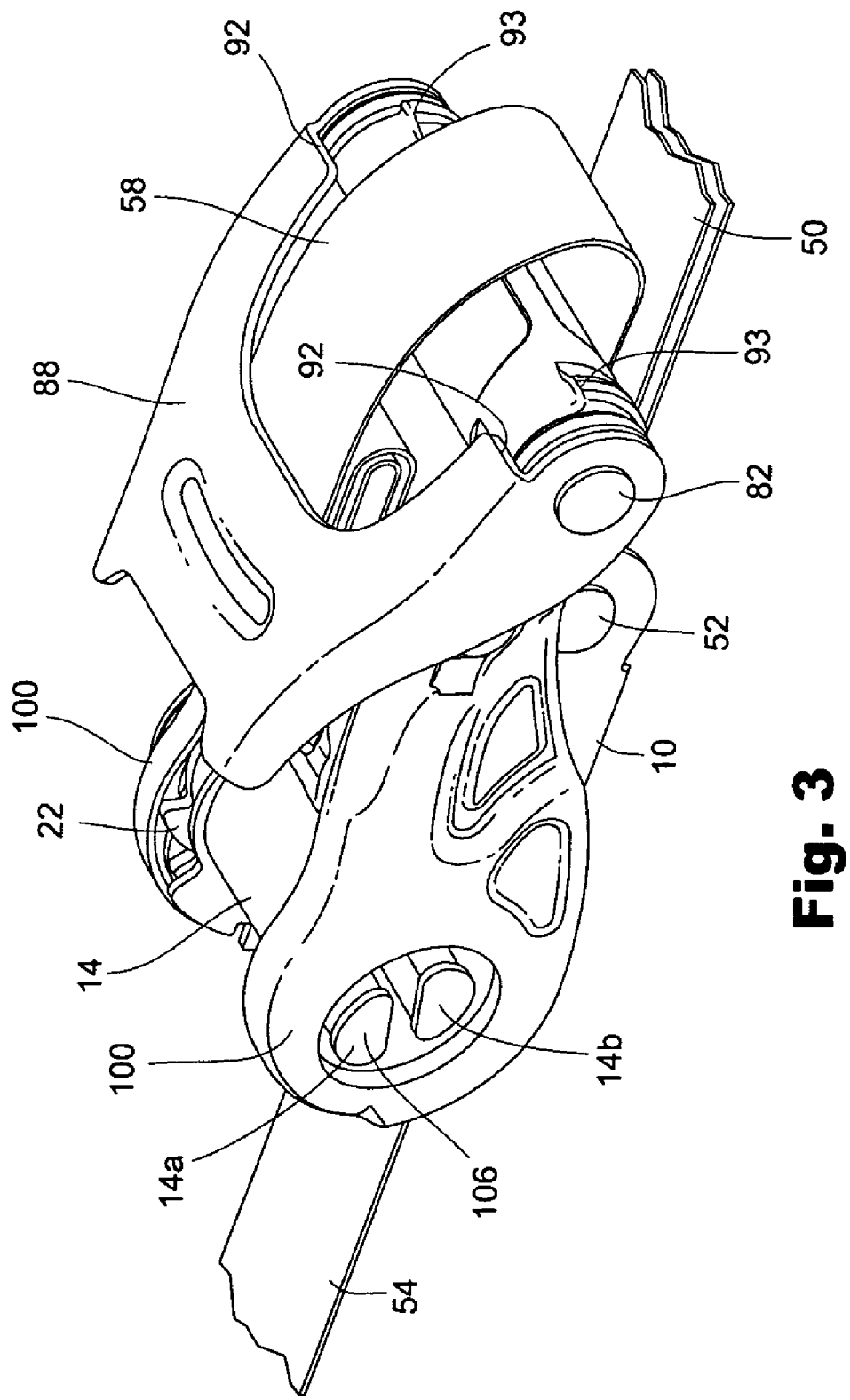
FIG. 3 is perspective view of the ratchet buckle of FIG. 1 and FIG. 3.
Figure 4:
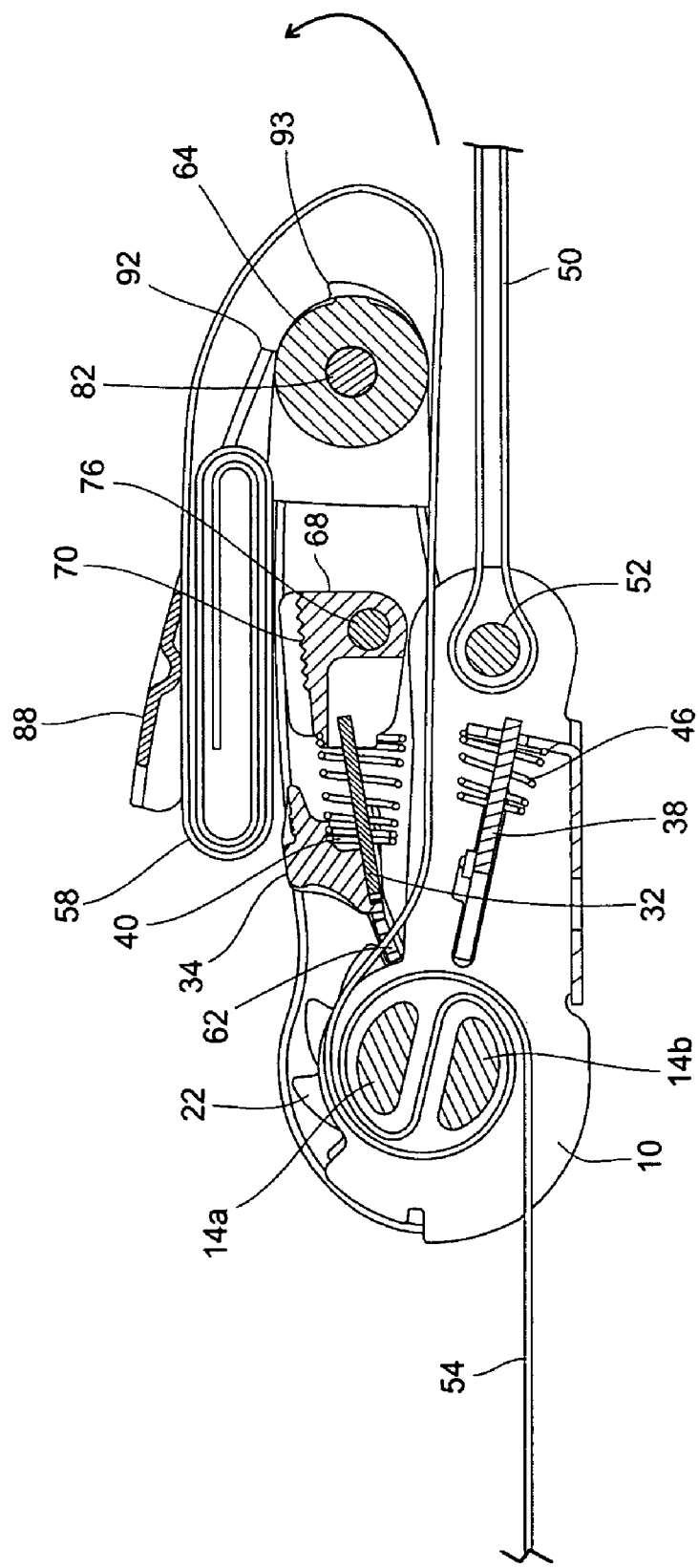
FIG. 4 is a side cross-sectional view of the ratchet buckle viewed along its longitudinal center, showing the excess strap routed through the buckle and then through the recess in the retention arm.
Figure 5:
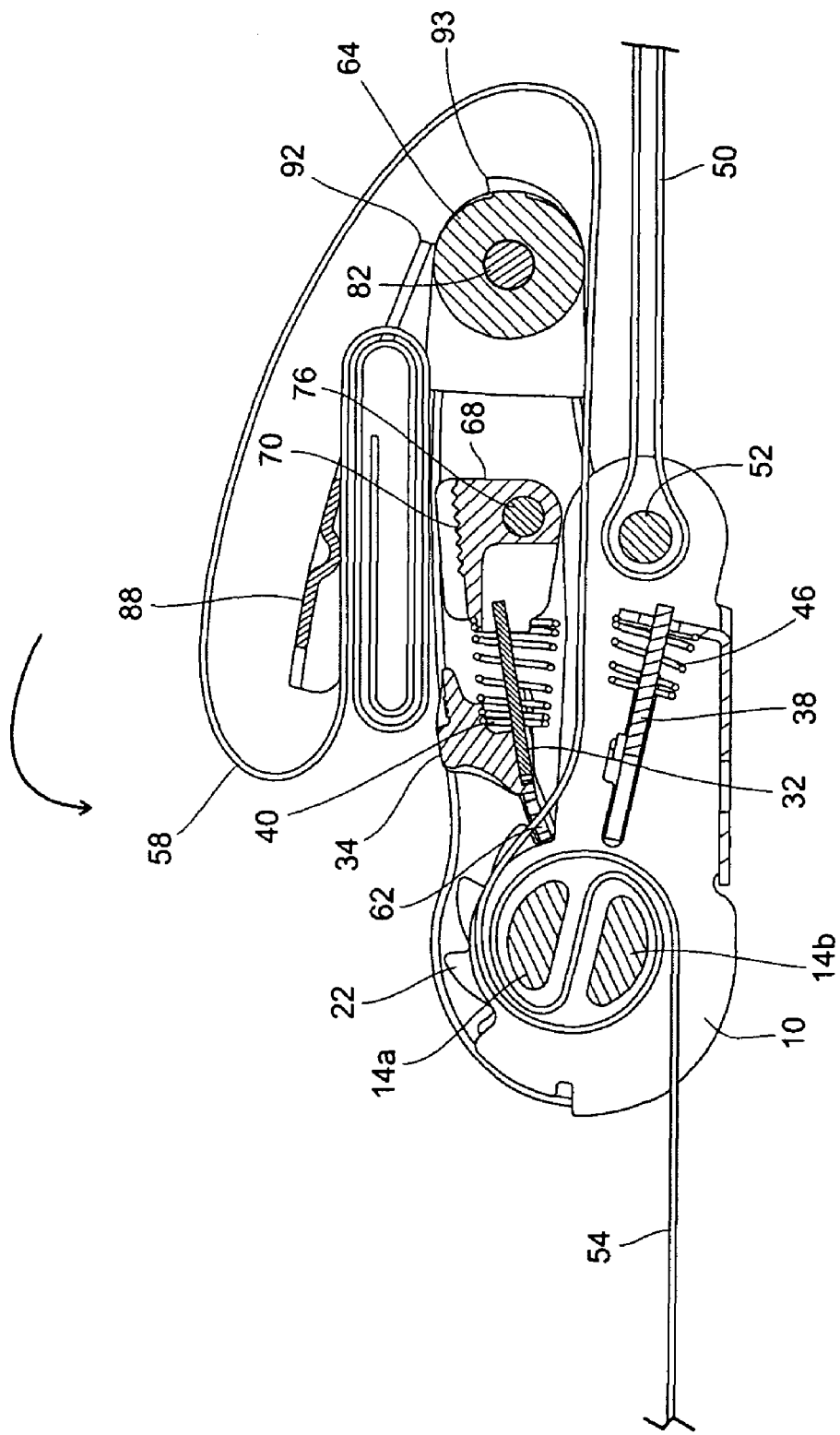
FIG. 5 is a side cross-sectional view of the ratchet buckle viewed along its longitudinal center, showing the excess strap routed through the buckle and then over the retention arm.
Figure 6:
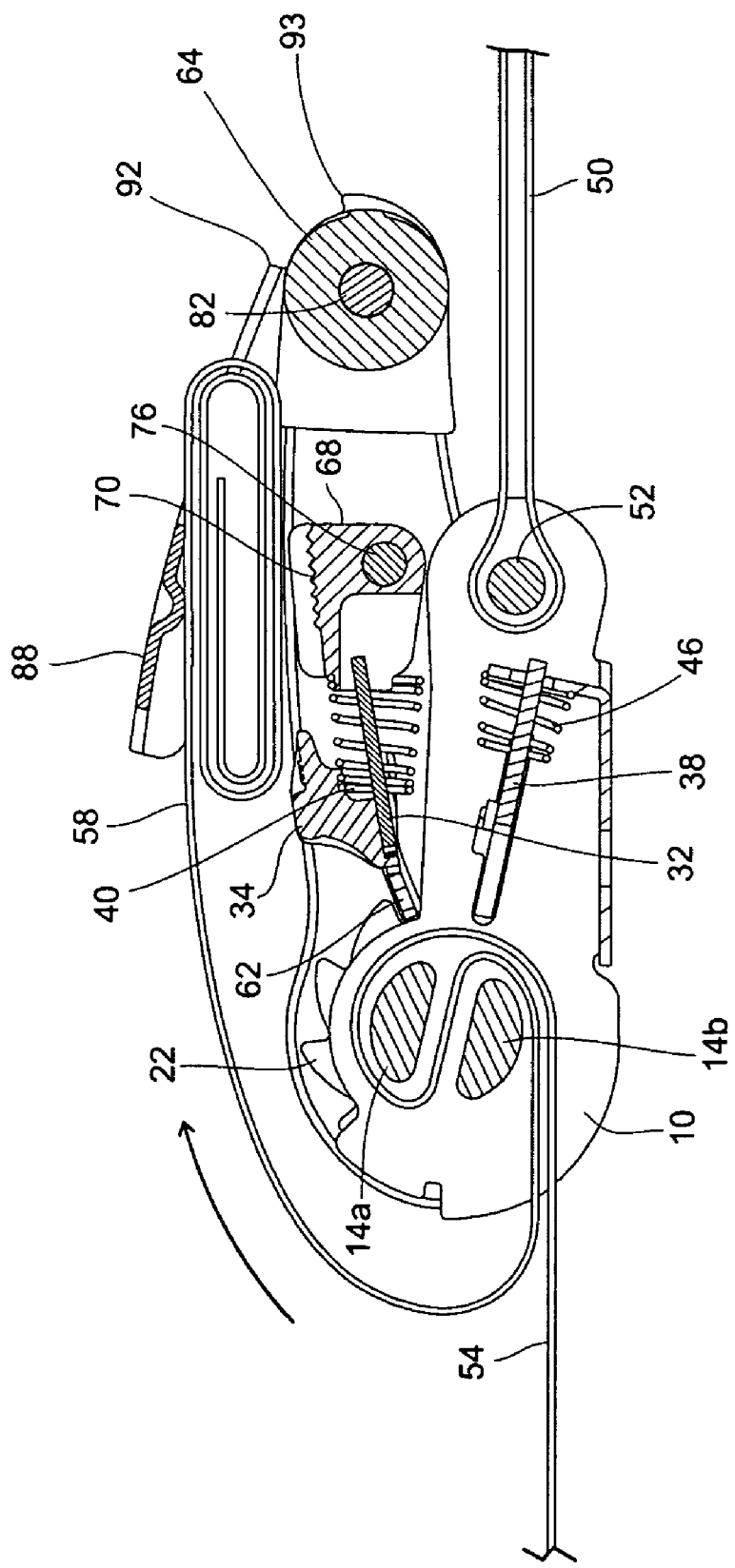
FIG. 6 is a side cross-sectional view of the ratchet buckle viewed along its longitudinal center, showing the excess strap routed from the spindle over the buckle to its retention position under the retention arm.
Figure 7:
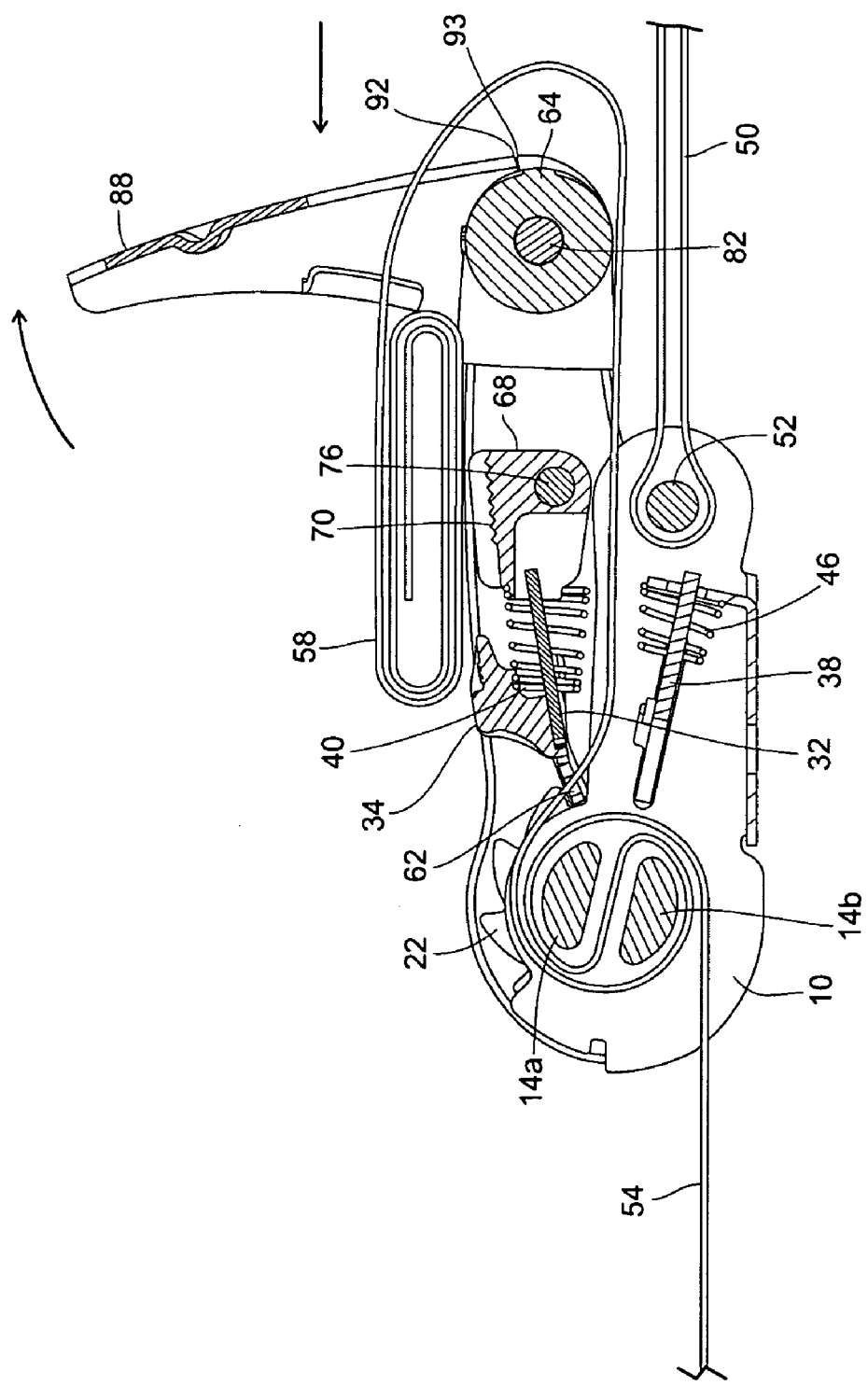
FIG. 7 is a side cross-sectional view of the ratchet buckle viewed along its longitudinal center, showing the excess strap routed through the buckle and then through the recess in the retention arm, shown with the retention arm raised to a limit with the arm in abutment with a stop on the handle.
Figure 8:
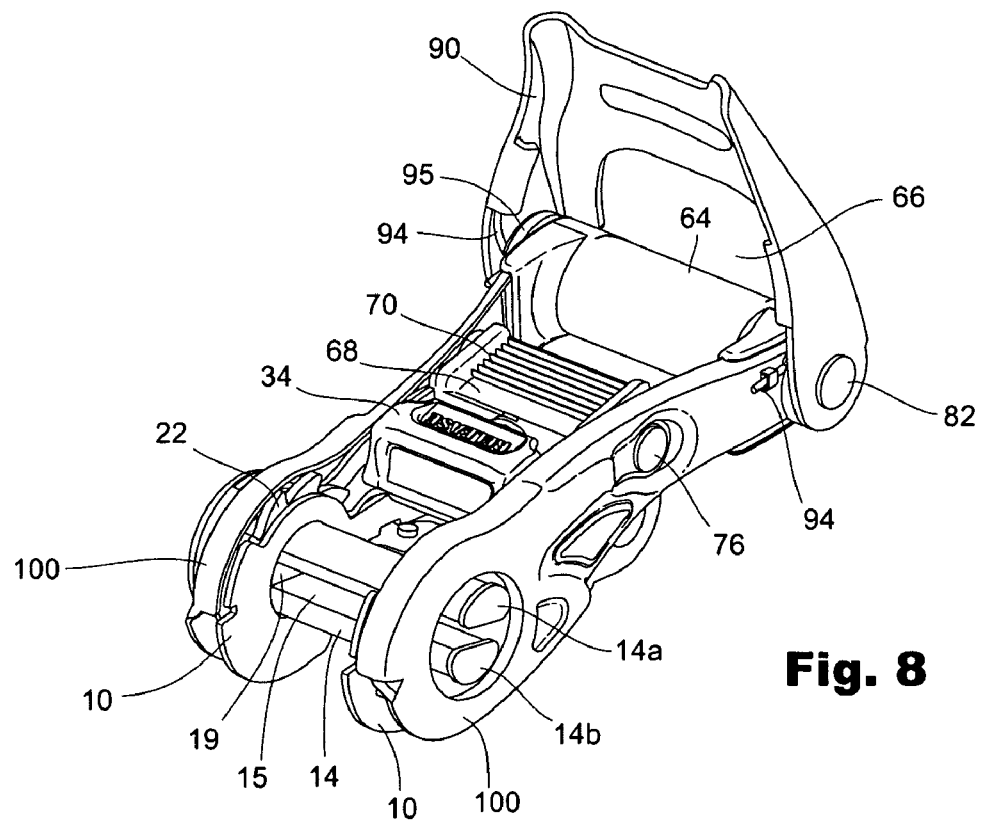
FIG. 8 is a perspective view of the ratchet buckle shown with the retention arm raised.
Figure 9:
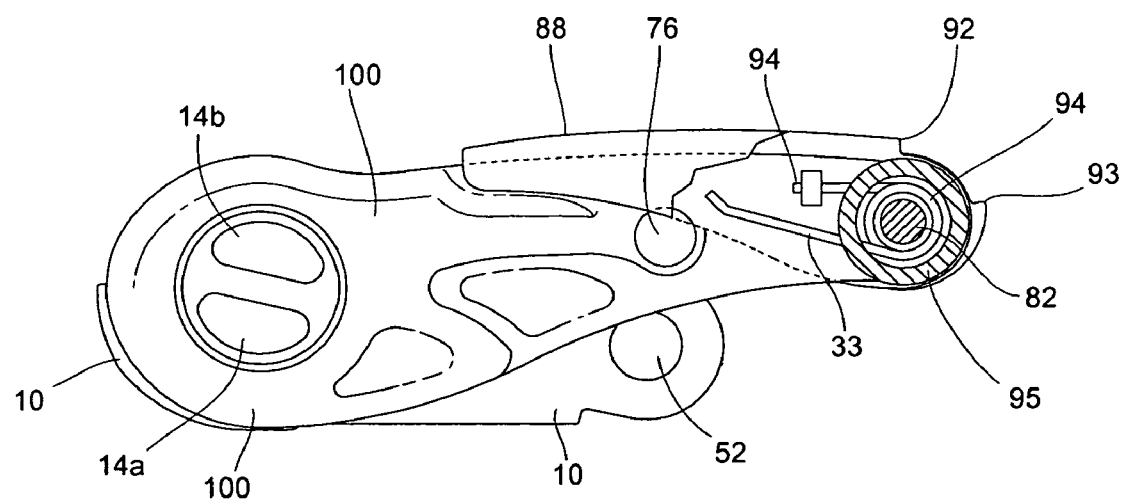
FIG. 9 is a side view of the buckle with a cut-away showing a retention arm spring that biases the retention arm down on the top of the buckle.
Figure 10:
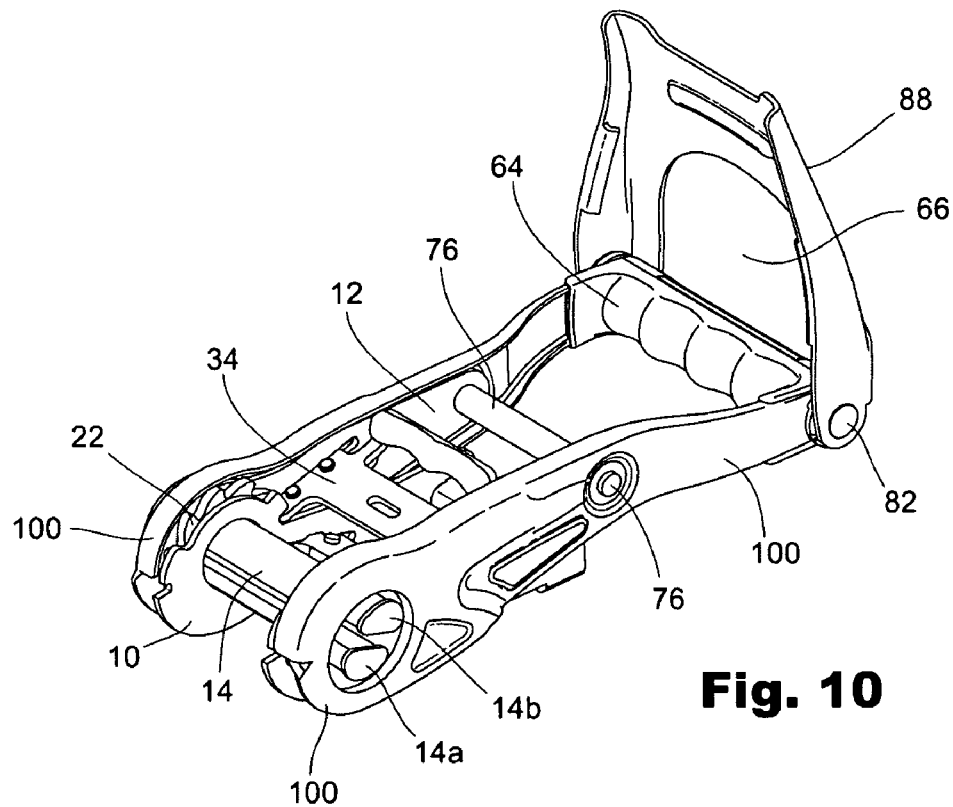
FIG. 10 is a perspective view of the buckle shown in FIG. 8 but with a release and strap support absent to show the ratchet plate and base sides, base shaft and handle.

The ratchet buckle for tightening a strap of the present invention comprises a base 10 and a crank arm 12 with opposing crank arm sides 12a, 12b mutually pivoting at a spindle 14 by a ratchet action.

The base 10 includes opposing base sides 10a, 10b upstanding from a base bottom 16 with each base side 10a, 10b having a base spindle hole 18 for receiving the spindle 14, which rotates coaxially within the base spindle holes 18 between the base sides 10a, 10b. Crank arm sides 12a, 12b partially overlap the base sides 10a, 10b outside the base sides 10a, 10b as the base sides 10a, 10b and the crank arm sides 12a, 12b mutually journaled to pivot at the spindle 14. The crank arm 12 also has a pair of crank holes 20 on respective crank arm sides 12a, 12b aligned with the base holes 18 such that the spindle 14 passes rotatably through the aligned holes 20, 18. A ratchet wheel 22 is located between respective base 12 and crank arm sides 12a, 12b align coaxially with the spindle 14 and aligned base spindle and crank holes 20, 18 and orthogonal to the base and crank arm sides 10a, 10b, 12a, 12b.

The spindle 14 is forward in the ratchet buckle and comprises two half spindles 14a, 14b disposed with opposing diametric faces 15 spaced apart forming a spindle slot 17 therebetween. Ends 19 of each half spindle 14a, 14b fit into matching semi circular holes 24 in the respective ratchet wheels 22 with each semi circular hole 24 receiving a half spindle end 19 such that as the crank arm 12 rotates the ratchet wheels 22, the spindle 14 also rotates.

The ratchet buckle functions in the normal manner of a ratchet to controllably rotate the spindle 14. In implementing the ratchet, each crank arm side 12a, 12b has a through crank side slot 30 angled radial to the spindle 14. A ratchet plate 32 extends between the crank arm sides 12a, 12b (and over the base sides 10a, 10b) with ratchet plate pawls 62 forward on the ratchet plate 32 disposed to engage both ratchet wheels 22 at respective crank arm sides 12a, 12b. The ratchet plate 32 is withdrawn from engagement with the ratchet wheels 22 by a user's pull of a ratchet release arm 34 rearward of the spindle that is connected to the ratchet plate 32. Ends of the ratchet plate 32 fit slidably in a radial direction with respective to the spindle 14 in respectively crank side slots 30, into and out of engagement with the ratchet wheels 22. The ratchet plate 32 is disposed to be pulled radially outward by action of the ratchet release arm 34 or released radially inward under bias of a ratchet spring 40. Sliding the ratchet plate 32 inward through the crank side slots 30 causes the ratchet plate 32 to engage the ratchet wheels 22. Similarly, sliding the ratchet plate 32 outward through the crank side slots 30 causes the ratchet plate 32 to disengage from the ratchet wheels 22, therein allowing the crank to rotate with the ratchet plate 32 outside of the ratchet wheels 22.

To effect a ratchet wheel lock, a lock plate 38 is provided in the base 10, extending between base sides 10a, 10b and passing through base slots 42. As with the crank slots 30, the base slots 42 are directed radially to the spindle 14 and ratchet wheels 22 below the crank arm 12. As the crank arm 12 is rotated rearward, a notch 44 in the respective crank arm sides 12a, 12b engage the lock plate 38 with the lock plate 38 engaging the ratchet wheels 22, thus preventing the lock plate 38 from moving rearward out of engagement with the ratchet wheels 22, thus preventing the ratchet wheels 22 and the spindle 14 from rotating. The lock plate 38 is released by lifting the crank arm 12 such that the notch 44 does not engage the lock plate 38. A lock spring 46 continues to bias the lock plate 38 into engagement with the ratchet wheels 22. As the crank arm 12 is further lifted and the ratchet release arm 34 is pulled backward as the crank arm 12 is rotated forward, a cam 48 forward on the crank arm respective sides 12a, 12b engages the lock plate 38 and moves the lock plate 38 rearward out of engagement with the ratchet wheels 22.

In use, a proximal end 49 of a rearward strap 50 that extends rearward from the buckle is secured to a transverse base shaft 52 rearward in the buckle between base sides 10a, 10b. A distal end of the rearward strap 50 (typically with a hook) is secured to a remote position rearward of the buckle. A distal end of a forward strap 54, typically with a hook, is extended forward of the buckle and secured to a remote location forward of the buckle (not shown). A proximal end 56 of the forward strap is then fed between the half spindles 14a, 14b and pulled through the spindle 14 until the forward strap 54 is nearly taut as may be easily done by a user without the aid of the ratchet. As the user rotates the crank arm 12 relative to the base 10, the forward strap 54 on both sides of the spindle slot 17 wrap around the spindle 14. Forward strap 54 that is pulled through the spindle 14 and not wrapped around the spindle 14 is excess strap 58.

The ratchet plate 32 has a gap 60 between ratchet plate pawls 62 through which the excess strap 58 may pass. The excess strap 58 may then be guided through the ratchet plate gap 60 and over the lock plate 38 and over the transverse base shaft 52 to which the rearward strap 50 is secured. From the transverse base shaft 52 the excess strap 58 may be routed under a crank handle 64, between crank arms 12 and through a retention arm recess 66. It may then be folded and placed folded on top of the buckle. A release arm 34 extends upward from the ratchet plate 32, both of which are secured to and deemed to be part of the base 10, and functions to release the ratchet plate pawls 62 when pulled rearward. The release arm 34 also serves to support the folded excess strap 58 above the ratchet plate 32.

A bench 68 is provided on the base 10 rearward on the crank arm 12 to also support the folded excess strap 58 rearward of the release arm 34 under the retention arm. The bench top 70 may be non-smooth to better keep the forward strap 54 from sliding. A lug 72 forward on each side of the bench 68 inserts into matching holes 74 in the crank arm 12. A crank arm shaft 76 passes through a transverse hole 78 in the bench 68 rearward of the lugs 72 and through aligned shaft holes 80 in the crank arm 12 to secure the bench 68 to the crank arm 12. The folded excess strap 58 is then supported over the buckle on the release arm 34 and the bench 68.

A retention arm 88 is provided that extends from the handle 64 over the top of the buckle. Retention arm sides 90 have retention arm holes 91 through which a handle shaft 82 on which the handle is mounted on the crank arm 12 also passes with the retention arm sides 90 located outside of the handle 64. The retention arm 88 thus is journaled to rotate on the handle shaft 82 between a raised position to allow the folded excess strap 58 to be conveniently placed on the release arm 34 and the bench 68 and a lowered position in which the retention arm 88 holds the folded excess strap 58 down firmly to the release arm 34 and the bench 68, the retention arm being of length to extend over at least a portion of the base 10 and onto the excess strap 58. The retention arm 88 is fully raised when it is rotated until a retention arm limiter 92 rearward on the retention arm 88 abuts a stop 93 on the handle 82 that prevents further retention arm rotation.

Figure 11:
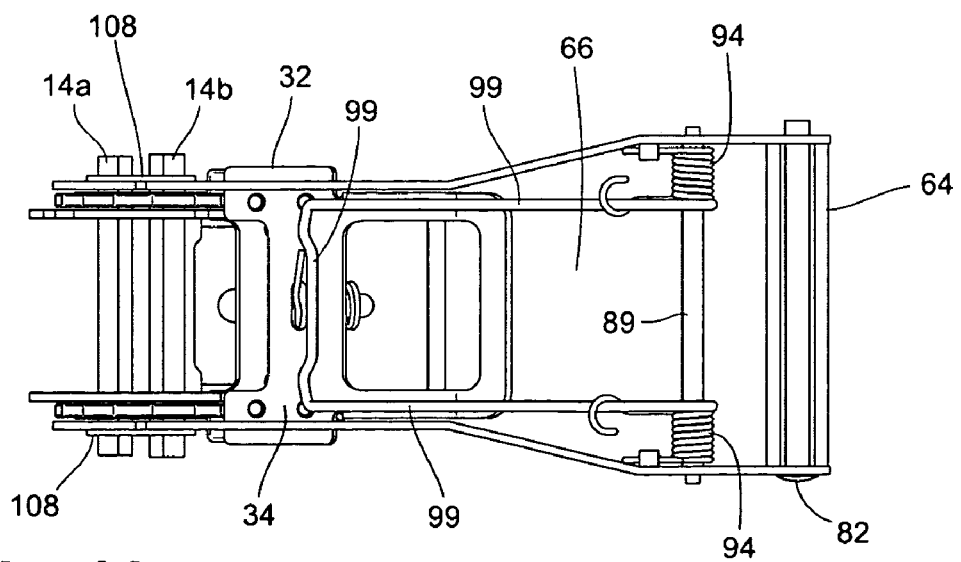
FIG. 11 is a top view of the buckle showing an alternate embodiment of the retention arm in 'mouse trap' form as a spring loaded wire arm.
Figure 12:
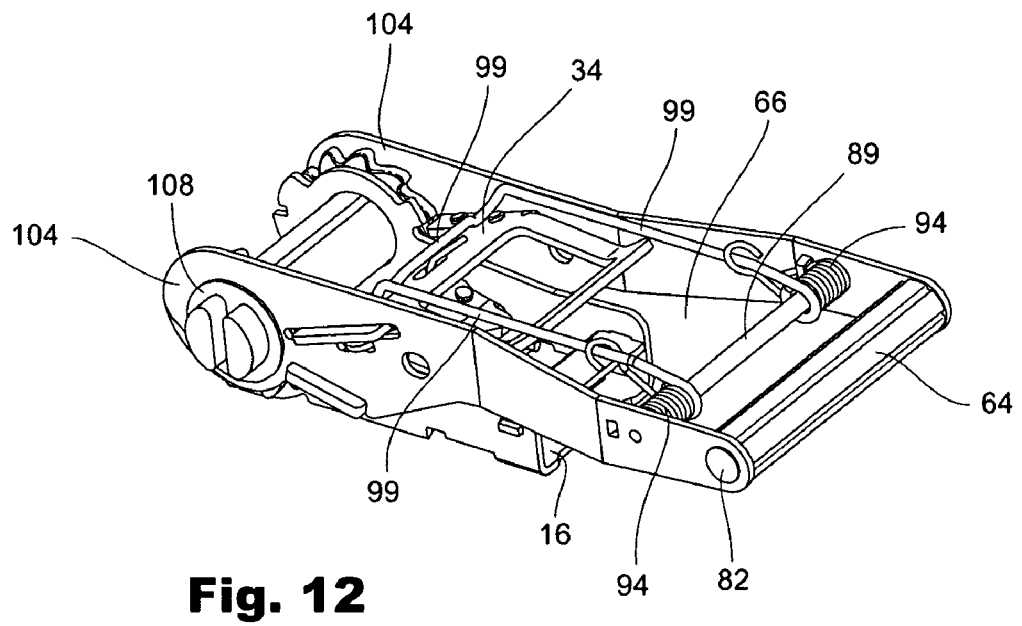
FIG. 12 is a rear perspective view of the buckle of FIG. 11.
Figure 13:
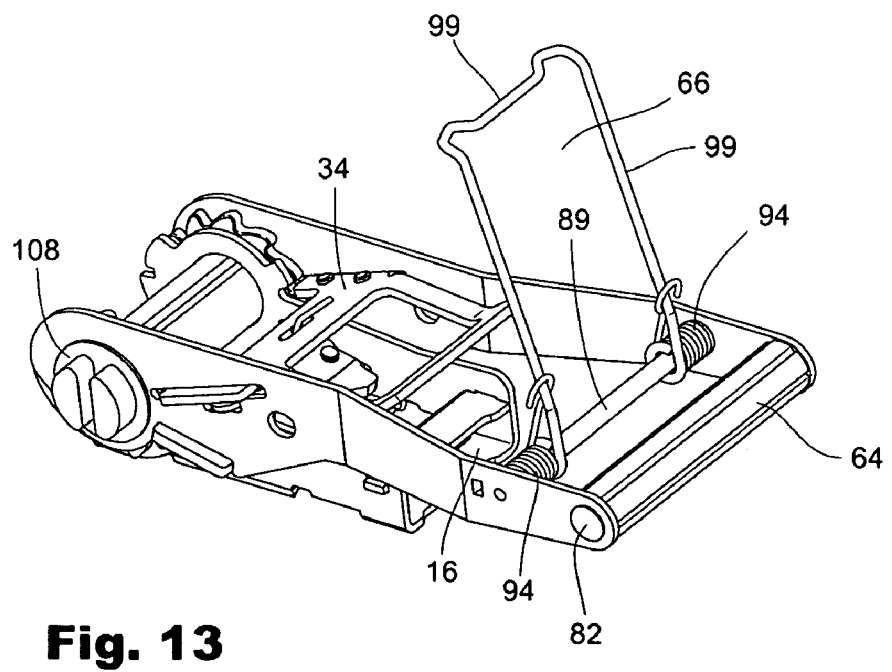
FIG. 13 is a rear perspective view of the buckle of FIG. 12, shown with the retention arm raised against the spring bias.
Figure 14:
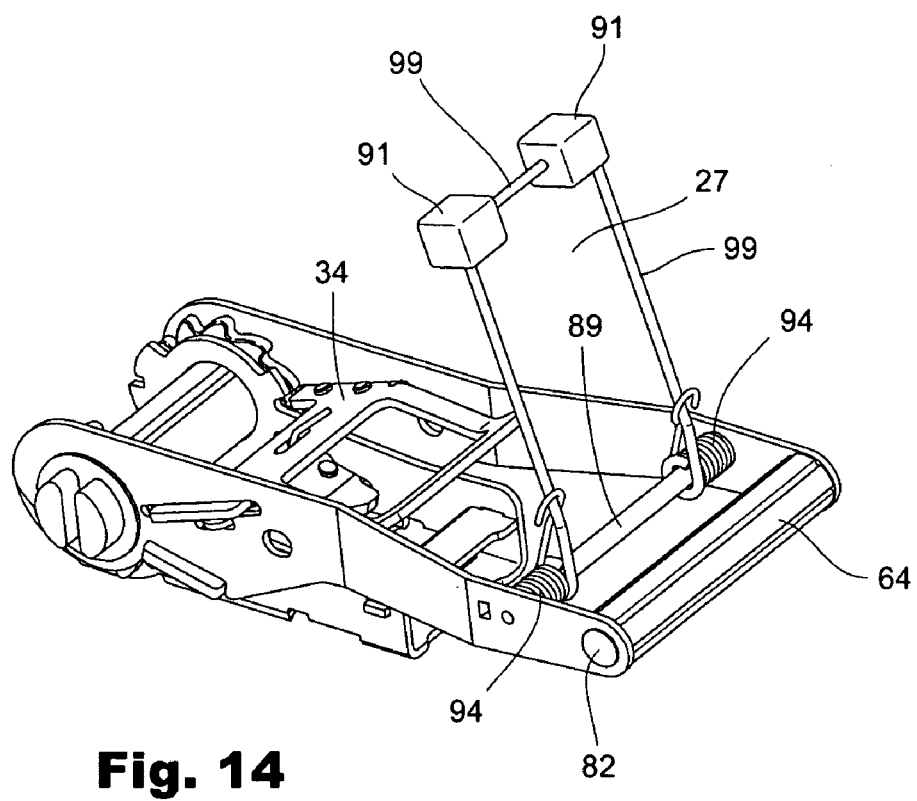
FIG. 14 is a rear perspective view of the buckle of FIG. 13, shown in another alternate embodiment with blocks at the retention arm distal end.
Figure 15:
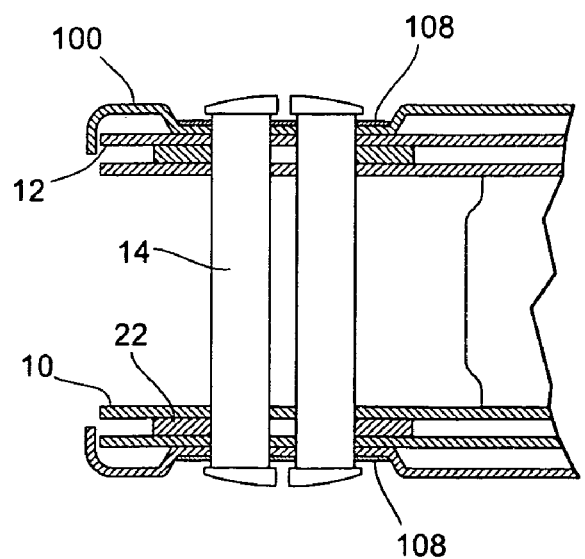
FIG. 15 is a top cross sectional view of a front portion of the buckle.
Figure 16:
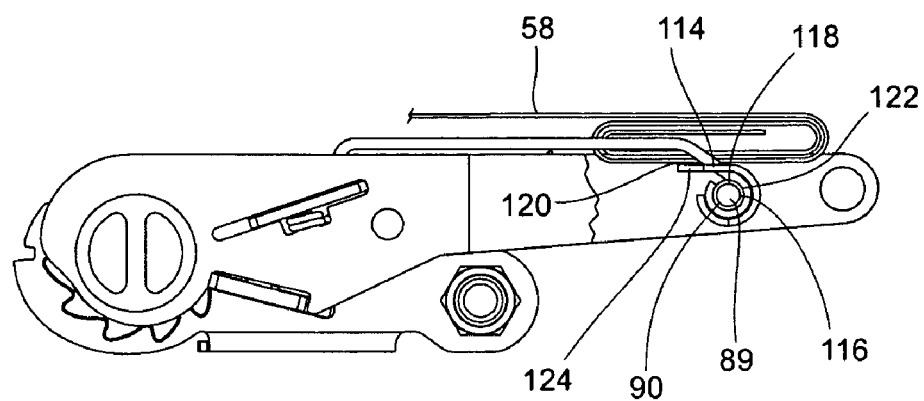
FIG. 16 is a side cut-away view showing the alternate embodiment of FIG. 11 additionally showing a cover over the shaft on which the wire arm rotates.
Figure 17:
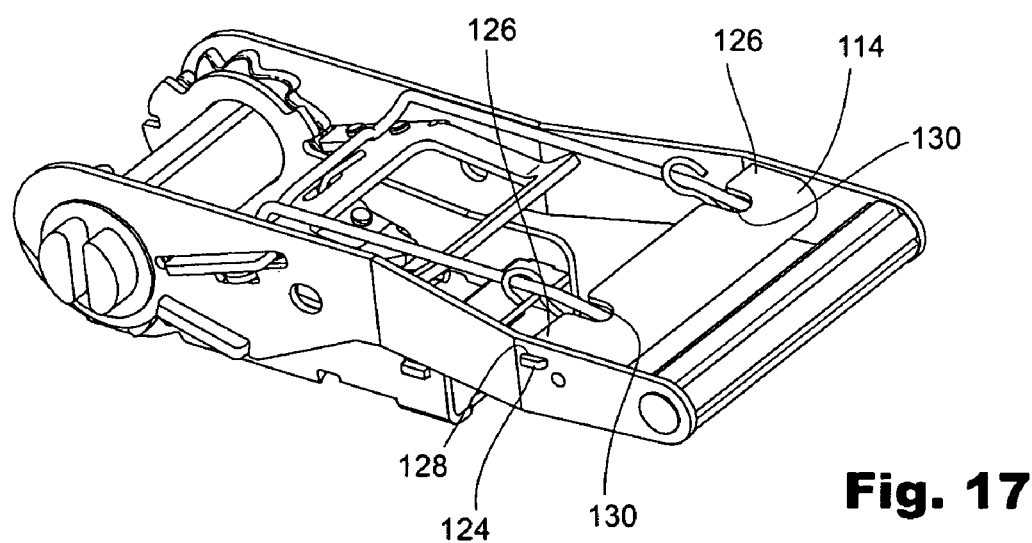
FIG. 17 is a perspective view showing the cover of FIG. 16.

The retention arm 88 is urged downward under bias of a retention arm spring 94 at the handle 64 through which the handle shaft 82 passes. A spring cap 95 covers the spring. (Any other form of spring bias is deemed included in this exemplary description.) The retention arm 88 is typically a panel substantially closed at its top 96 to serve as a cover over the bench 68 to shield the buckle thereunder from damage and dirt. Typically, the retention arm 88 narrows from ends of the handle 64 to its unattached end 98 which is sized to match the width of the excess strap 58 to, in cooperation with the retention arm sides 90, keep the excess strap 58 from sliding laterally from under the retention arm 88. In an alternate embodiment, the retention arm 88 may simply comprise a wire frame 99 as shown in FIGS. 11, 12, and 13, in "spring loaded mouse trap" style rotating under spring bias on an alternate retention arm shaft 89. A block 91 may be provided on the frame 99 to assist in holding the excess strap. A cover 114 may be included that wraps around and over rearward and upward portions 116, 118 of the alternate retention arm shaft 89 shielding the shaft 90 and providing a smooth support surface 120 adapted to support a folded excess strap 58 thereon. The cover 114 also shields springs 122 thereon that bias the retention arm 88 downward onto the base 10 or folded excess strap thereon. The cover 114 is held in non-rotating position with ears 124 on cover ends 126 that insert into cover slots 128 in a guard 100 (described below). Cover slits 130 intermediate and forward in the guard allow the wire frame to rotate upward to receive the excess strap 58.

The retention arm recess 66 that was mentioned above through which the excess strap 58 may pass as routed from the spindle 14 is opposite the handle 64. The folded excess strap 58 on the bench 68 typically extends through the recess 66 when the retention arm 88 is in its lowered position. Thus a minimal frame retention arm and a broad panel retention arm are illustrated as representative of a range of retention arms that are possible, all with the same primary function and affect of securing the excess strap to the ratchet buckle. For all purposes herein, it should be understood that all retention arms of any form that operate to secure the excess strap to the ratchet buckle are deemed included in the description of these two representative retention arms.

A guard 100 with a forward portion 102 on each buckle side 104 is mounted on its forward end 101 on the spindle ends 106 outside of the respective crank arms 12 and intermediate its length to the crank arm rearward end 103 such that a guard rearward portion 105 extends rearward of the crank arm, thus resulting in a double layer leverage arm relative to the base 10, which double layer leverage arm comprises the crank arm 12 and the guard 100 thereby effectively achieving a strengthened crank arm with increased leverage relative to the base 12 where the handle 64 is attached to the guard 100 in its rearward portion 105, rearward of the crank arm 12. The handle 64 is secured to the guard 100 with the handle shaft 82 passing through a handle hole 84 and matching aligned guard holes 86 with the guard 100 outside the crank arm 12. The alternate retention arm shaft 89 extends between the guard 100 on each ratchet buckle side.

A ring 108 with a bar 110 diametrically therethrough is mountable to the spindle at each spindle end 106 outside the guard 100 and the crank arm 12 with the bar 110 fitting in the spindle slot 17 to secure the guard 100, crank arm 12 and ratchet wheel 22 to the spindle on each buckle side. Typically, the ring 108 is of size to match the spindle end 106 and fits within a guard recess 112 at the spindle end.

In summary, then the invention disclosed herein comprises a ratchet buckle for tightening a strap including a base, a spindle, a ratchet wheel and a pawl cooperating with the ratchet wheel in a ratchet action. The ratchet buckle comprises a crank arm rotatably journaled in the base by the spindle on each ratchet buckle side to which the crank arm and the ratchet wheel are secured, the spindle having a spindle slot through which the strap may pass such that as the crank arm is rotated with the base and crank arm pivoting apart the strap is tightened with a portion of the strap wound on the spindle and with excess strap pulled through the spindle slot and remaining unwound on the spindle after the strap is tightened and foldable over and supported by at least a portion of the base, a handle on the crank arm, a retention arm journaled to rotate on a shaft on the crank arm, typically a handle shaft on the crank arm on which the handle is mounted, and over at least a portion of the base and being of length to extend over said at least a portion of the base and onto said excess strap thereon, the retention arm being biased toward or constrained against said folded excess strap therein securing said excess strap to said at least a portion of the base, wherein the retention arm includes a recess through which the excess strap may pass from the spindle and through which the folded excess strap may extend to at least the handle wherein the retention arm is effectively a panel that covers a substantial portion of the buckle for aesthetic purposes and for protection of the buckle, wherein the retention arm includes sides that constrain the excess strap from moving laterally, and wherein the retention arm narrows from ends of the handle to approximately a width of the strap; a release arm intermediate the base and rearward of the spindle adapted to release the pawl from engagement with the ratchet wheel and adapted to support the folded excess strap; a bench on the base rearward of the release arm for supporting the folded excess strap under the retention arm, wherein the release arm and the bench together with the spindle provide an effective platform on which the folded excess strap may be supported over the length of the base; a guard outside the crank arm on each ratchet side and also rotatably journaled in the base by the spindle on its forward end and pivoting with the crank arm, the crank arm being secured to the guard intermediate the length of the guard forming a double layered leverage arm, the guard extending rearward of the crank arm and the base at a guard rearward end, the guard covering the ratchet wheel and crank arm, the handle being secured to the guard at the guard rearward end with the guard rotatable on the handle shaft, thus increasing the effective strength of crank arm and extending the effective length and therefore the leverage of the crank arm relative to the base.

The double layered leverage arm is therefore journaled in the base by the spindle and is adapted to converge and diverge relative to the base in a reciprocating ratchet action in concert with the ratchet wheel and pawl. The double layered leverage arm first layer then comprises the crank arm and the leverage arm second layer comprises the guard outside the crank arm, which guard and therefore the double layered leverage arm extends over the ratchet wheel and crank arm as a protecting shield, the crank arm and the guard forming a double layer the full extent of the crank arm. The ratchet wheel is therefore sandwiched at the spindle between the base and the double layered leverage arm. Therefore, as the double layered leverage arm is reciprocatingly rotated relative to the base, the strap is tightened with a portion of the strap being wound on the spindle and with excess strap being pulled through the spindle slot and remaining unwound on the spindle after the strap is tightened and adapted to fold over and be supported by at least a portion of the base, and the base being adapted to support the folded excess strap.

Having described the invention, what is claimed is as follows:

1. A ratchet buckle for tightening a strap including a base, a spindle, a ratchet wheel and a pawl cooperating with the ratchet wheel in a ratchet action, comprising:
    a crank arm rotatably journaled in the base by the spindle on each ratchet buckle side to which the crank arm and the ratchet wheel are secured, the spindle having a spindle slot through which the strap may pass such that as the crank arm is rotated with the base and crank arm pivoting apart the strap is tightened with a portion of the strap wound on the spindle and with excess strap pulled through the spindle slot and remaining unwound on the spindle after the strap is tightened and adapted to fold over and be supported by at least a portion of the base, and the base being adapted to support the folded excess strap,
    a handle on the crank arm,
    a retention arm journaled to rotate on the handle shaft and over at least a portion of the base and being of length to extend over said at least a portion of the base and onto said excess strap thereon, the retention arm being biased toward or constrained against said folded excess strap therein securing said excess strap to said at least a portion of the base.

2. The ratchet buckle of claim 1 wherein the retention arm includes a recess through which the excess strap may pass from the spindle and through which the folded excess strap may extend to at least the handle.

3. The ratchet buckle of claim 1 further comprising a bench on the base for supporting the folded excess strap under the retention arm.

4. The ratchet buckle of claim 1 further comprising
    a release arm intermediate the base and rearward of the spindle adapted to release the pawl from engagement with the ratchet wheel and adapted to support the folded excess strap,
    a bench on the base rearward of the release arm for supporting the folded excess strap under the retention arm, wherein the release arm and the bench together with the spindle provide an effective platform on which the folded excess strap may be supported over the length of the base.

5. The ratchet buckle of claim 1 wherein the retention arm is effectively a panel that covers a substantial portion of the buckle.

6. The ratchet buckle of claim 1 wherein the retention arm includes sides that constrain the excess strap from moving laterally.

7. The ratchet buckle of claim 6 wherein the retention arm narrows from ends of the handle to approximately a width of the strap.

8. The ratchet buckle of claim 1 further comprising a guard outside the crank arm on each ratchet buckle side and also rotatably journaled in the base by the spindle on its forward end and pivoting with the crank arm, the crank arm being secured to the guard intermediate the length of the guard, the guard extending rearward of the crank arm and the base at a guard rearward end, the guard covering the ratchet wheel and crank arm, the handle being secured to the guard at the guard rearward end with the guard rotatable on the handle shaft.

9. The ratchet buckle of claim 8 wherein the retention arm comprises a wire frame that rotates on an alternate retention arm shaft extending between the guard on each ratchet buckle side.

10. The ratchet buckle of claim 9 further comprising a cover that wraps around and over rearward and upward portions of the alternate retention arm shielding the shaft and providing a smooth support surface adapted to support said folded excess strap thereon.

11. A ratchet buckle for tightening a strap including a base, a spindle, a ratchet wheel and a pawl cooperating with the ratchet wheel in a ratchet action, comprising:
    a crank arm rotatably journaled in the base by the spindle to which the crank arm and the ratchet wheel are secured, the spindle having a spindle slot through which the strap may pass such that as the crank arm is rotated with the base and crank arm pivoting apart the strap is tightened with a portion of the strap wound on the spindle and with excess strap pulled through the spindle slot and remaining unwound on the spindle after the strap is tightened and foldable over at least a portion of the base, a handle on the crank arm,
    a guard outside the crank arm and also rotatably journaled in the base by the spindle on its forward end and pivoting with the crank arm, the crank arm being secured to the guard intermediate the length of the guard, the guard extending rearward of the crank arm and the base at a guard rearward end, the guard covering the ratchet wheel and crank arm, the handle being secured to the guard at the guard rearward end.

12. A ratchet buckle for tightening a strap, a base, a spindle, a ratchet wheel journaled in the base by the spindle and a pawl cooperating with the ratchet wheel in a ratchet action, the improvement comprising a double layered leverage arm journaled in the base by the spindle and adapted to converge and diverge relative to the base in a reciprocating ratchet action in concert with the ratchet wheel and pawl, a leverage arm first layer comprising a crank arm and a leverage arm second layer comprising a guard outside the crank arm and extending over the ratchet wheel and crank arm as a protecting shield, the crank arm and the guard forming a double layer the full extent of the crank arm.

13. The ratchet buckle of claim 12 wherein the ratchet wheel is sandwiched at the spindle between the base and the double layered leverage arm.

14. The ratchet buckle of claim 12 wherein the spindle includes a spindle slot through which the strap may pass such that as the double layered leverage arm is reciprocatingly rotated relative to the base, the strap is tightened with a portion of the strap being wound on the spindle and with excess strap pulled through the spindle slot and remaining unwound on the spindle after the strap is tightened and adapted to fold over and be supported by at least a portion of the base, and the base being adapted to support the folded excess strap, and further comprising a handle on the crank arm, a retention arm journaled to rotate on the handle shaft over at least a portion of the base and being of length to extend over said at least a portion of the base and onto said excess strap thereon, the retention arm being biased toward or constrained against said folded excess strap therein securing said excess strap to said at least a portion of the base.

15. The ratchet buckle of claim 14 wherein the retention arm includes a recess through which the excess strap may pass from the spindle and through which the folded excess strap may extend to at least the handle.

16. The ratchet buckle of claim 14 further comprising a bench on the base for supporting the folded excess strap under the retention arm.

17. The ratchet buckle of claim 14 further comprising a release arm intermediate the base and rearward of the spindle adapted to release the pawl from engagement with the ratchet wheel and adapted to support the folded excess strap, a bench on the base rearward of the release arm for supporting the folded excess strap under the retention arm, wherein the release arm and the bench together with the spindle provide an effective platform on which the folded excess strap may be supported over the length of the base.

18. The ratchet buckle of claim 14 wherein the retention arm is effectively a panel that covers a substantial portion of the buckle.

19. The ratchet buckle of claim 14 wherein the retention arm includes sides that constrain the excess strap from moving laterally.

20. The ratchet buckle of claim 14 wherein the retention arm narrows from ends of the handle to approximately a width of the strap.

21. The ratchet buckle of claim 14 wherein the retention arm includes a recess through which the excess strap may pass from the spindle and through which the folded excess strap may extend to at least the handle, and further comprising a release arm intermediate the base and rearward of the spindle adapted to release the pawl from engagement with the ratchet wheel and adapted to support the folded excess strap, a bench on the base rearward of the release arm for supporting the folded excess strap under the retention arm, wherein the release arm and the bench together with the spindle provide an effective platform on which the folded excess strap may be supported over the length of the base.

* * * * *